(12) United States Patent
O'Dell et al.

(10) Patent No.: US 11,758,857 B2
(45) Date of Patent: *Sep. 19, 2023

(54) SYSTEM AND METHOD FOR FLUID FLOW MEASUREMENT AND CONTROL

(71) Applicant: HOT SOCKET, LLC, Los Altos, CA (US)

(72) Inventors: Thomas Anthony O'Dell, Sunnyvale, CA (US); Paul Christopher Dorsey, Los Altos, CA (US)

(73) Assignee: HOT SOCKET, LLC, Los Altos, CA (US)

( * ) Notice: Subject to any disclaimer, the term of this patent is extended or adjusted under 35 U.S.C. 154(b) by 452 days.

This patent is subject to a terminal disclaimer.

(21) Appl. No.: 16/929,456

(22) Filed: Jul. 15, 2020

(65) Prior Publication Data

US 2020/0344963 A1 Nov. 5, 2020

Related U.S. Application Data

(63) Continuation of application No. 16/057,331, filed on Aug. 7, 2018, now Pat. No. 10,736,280.

(51) Int. Cl.
| | |
|---|---|
| *G05B 15/02* | (2006.01) |
| *A01G 25/16* | (2006.01) |
| *B05B 12/12* | (2006.01) |
| *B05B 1/30* | (2006.01) |
| *A01G 25/02* | (2006.01) |
| *G05D 7/06* | (2006.01) |

(52) U.S. Cl.
CPC ........... *A01G 25/165* (2013.01); *A01G 25/02* (2013.01); *B05B 1/30* (2013.01); *B05B 12/12* (2013.01); *G05B 15/02* (2013.01); *G05D 7/0617* (2013.01); *G05B 2219/2625* (2013.01)

(58) Field of Classification Search
CPC ........ A01G 25/02; A01G 25/165; B05B 1/30; B05B 12/006; B05B 12/12; G05B 15/02; G05B 2219/2625; G05D 7/0617; G05D 7/0664

See application file for complete search history.

(56) References Cited

U.S. PATENT DOCUMENTS

| | | | | |
|---|---|---|---|---|
| 10,756,919 B1 * | 8/2020 | Kerzner | ............... | G05D 1/0282 |
| 11,047,496 B1 * | 6/2021 | McConnell | ............. | G01M 3/28 |
| 2002/0195105 A1 * | 12/2002 | Blue | ................... | A61M 16/024 |
| | | | | 128/205.25 |
| 2013/0008542 A1 * | 1/2013 | Irwin | .................... | F16K 37/005 |
| | | | | 137/859 |

* cited by examiner

*Primary Examiner* — Yuhui R Pan
(74) *Attorney, Agent, or Firm* — Fountainhead Law Group P.C.

(57) ABSTRACT

System and method for controlling an irrigation system using feedback from flow meters installed in an irrigation system are described. The system and method allows for automatic detection of the number of flow meters and their relation to controls valves attached to an irrigation system and for precise and reliable fluid flow measurements. Typical water flows for the system are learned and then compared to current water flows to detect water leaks (i.e., high water flow), malfunctioning control valves and/or low water flow and subsequently trigger electronic alerts to the user when system malfunctions are detected.

16 Claims, 7 Drawing Sheets

|  |  | Flow Meter Number | | | | | |
|---|---|---|---|---|---|---|---|
|  |  | 1 | 2 | 3 | 4 | 5 | 6 |
| Valve (Zone) Number | 1 | X | O | O | O | O | O |
| | 2 | X | O | O | O | O | O |
| | 3 | X | O | O | O | O | O |
| | 4 | X | O | O | O | O | O |
| | 5 | X | O | O | O | O | O |
| | 6 | X | O | O | O | O | O |

Fig. 5

|  | Flow Meter Number | | | | | |
|---|---|---|---|---|---|---|
|  | 1 | 2 | 3 | 4 | 5 | 6 |
| Valve (Zone) Number  1 | X | O | O | O | O | O |
| 2 | O | X | O | O | O | O |
| 3 | O | O | X | O | O | O |
| 4 | O | O | O | X | O | O |
| 5 | O | O | O | O | X | O |
| 6 | O | O | O | O | O | X |

Fig. 6

SYSTEM AND METHOD FOR FLUID FLOW MEASUREMENT AND CONTROL

CROSS-REFERENCE TO RELATED APPLICATION

The present application is a continuation of and claims the benefit of U.S. application Ser. No. 16/057,331, filed Aug. 7, 2018, the contents of which are hereby incorporated herein by reference.

TECHNICAL FIELD

The present disclosure relates to a system and method for the control and monitoring of water flow in an irrigation system. Particularly, embodiments of the present disclosure relate to the use of fluid flow measurements to determine if the system is operating correctly or if the irrigation system is malfunctioning. More particularly, embodiments of the present disclosure relate to a system and method for detecting the location and number of flow meters attached to an irrigation system as well as the precise and reliable measurement of water flow. Typical water flows for the system are learned and then compared to current water flows to detect water leaks, low water flow and/or malfunctioning fluid control valves. When the fluid control system is not operating properly, these methods are further used to trigger electronic alerts to the user and close water control valves depending on the severity of the system failure. Embodiments of the present disclosure are also further applicable to any fluid control system.

BACKGROUND

An automated system for distributing fluid from a source to multiple areas of use has many applications, and is hereinafter referred to as a fluid control system. One example of such a fluid control system distributes water to growing plants, and is hereinafter referred to as an irrigation system. The basic irrigation system known in the art uses a set of wires that run from a sprinkler timer controller, hereinafter referred to as the controller, to a set of remote electrical control valves. The controller has the ability to automatically direct the water flow from a main water source to multiple use areas hereinafter referred to as zones. This is accomplished via fluid control valves which open and close to allow water to flow to a specific use area when power is delivered to a specific valve by the controller. The amount of time the control valve is open is hereinafter referred to as valve runtime which is typically programmed in the controller as part of a regular watering schedule.

A typical irrigation system is comprised of one or more zones with each zone comprised of one control valve and one or more apparatus for dispensing water such as spray heads or drip emitters which are installed after each control valve. The water dispensing apparatus are rated for a certain fluid flow range depending on the specific design and size of the apparatus. Consequently, the volume of water dispensed to each zone is determined by a number of factors including main water pressure, the type and number of fluid dispensing apparatus and the control valve runtime for each zone. The valve runtime is determined by the irrigation controller which typically uses a preset time to control the valve runtime. The preset time is programmed by the user or in some cases by so-called smart controllers which use local weather, plant and terrain conditions to automatically determine valve runtimes.

In order to save water and money, a user typically has two approaches available: (1) the user can manually reduce valve runtimes as much as possible based on physical observations of the plants and environment to determine minimum amount of water needed at any point in time to maintain healthy plants, or (2) the user can rely on "smart" controllers to determine optimal runtimes based on local weather conditions and user input on plant, soil, sunlight and terrain conditions. Both of these approaches have serious limitations. Approach (1) is inherently inefficient and impractical as the user is not able to physically continuously monitor plant and local weather conditions and make adjustments as needed. Approach (2) assumes the user has an extensive knowledge of soil and plant types for each zone within the irrigation system and that these factors are uniform throughout each zone which is unlikely in either case. Beyond the limitations described specific to these two approaches, approaches (1) or (2) do not take into account the variation in actual volume of water delivered to each zone and how that volume of water is dispensed over the actual zone area. Both cases assume a constant volume of water will be delivered to each zone for a specified valve runtime. In reality, the volume of water actually delivered to each zone can vary significantly due to leaks, clogs, malfunctioning valves, broken water dispensing apparatus and/or even changes in the volume of water lines. The loss or inefficient use of water associated with these factors can be significantly greater than the savings in water or money as described by approaches (1) or (2).

SUMMARY

Embodiments of the present disclosure provide a system and method for providing real-time water flow feedback and control of an irrigation system. This system provides real-time water flow data to the irrigation controller so that the system can alert the user to take corrective actions such as repairing sprinkler lines to save water and reduce costs. The irrigation system is comprised of at least one irrigation controller with at least one zone and at least one flow meter but no more than one flow meter per control valve for measuring water flow for any specific zone. A zone defines the use area to be watered and the flow of water to that zone is controlled by the zone's corresponding control valve. Consequently, the terms 'zone' and 'control valve' are synonymous since there is a one-to-one relation between zones and control valves. Control valves and flow meters are connected to the irrigation controller either by wires or wirelessly so that the control valves can be opened (i.e., activated) or closed (i.e., deactivated) and data from the flow meter can be received by the irrigation controller.

The location of the flow meters and their relation to each control valve can be manually input to the irrigation controller by the user but this approach can be prone to mistakes. An approach of an embodiment of the present disclosure allows for the irrigation controller to automatically learn the relations between control valves and flow meters. This is accomplished based on water flow measurement feedback by cycling each control valve to an active (open) state in sequence. Once the relation of each flow meter relative to each control valve is known, the system will learn the reference typical water flow for each zone when its corresponding control valve is activated. This flow learning should ideally occur when the user has determined that the system is in proper operating condition because this reference typical water flow, hereinafter referred to as the typical flow, will be the reference for future water flow measurements and the basis for triggering alerts.

During scheduled watering operations, the controller will measure water flow for each active control valve (i.e., zone) and compare these flow values to the typical water flow for each corresponding zone. If the water flow during scheduled watering operation is greater than or less than control limits set by the user relative to the typical flow then the irrigation controller can close (deactivate) the control valve and/or notify the user via e-mail or text (i.e., SMS) so that the faulty zone can be inspected for damage by the user. Furthermore, electronic alerts issued by the irrigation controller can be more specific such as low 'flow' or 'high flow' depending on whether the measured fluid flow is less than or greater than the typical flow for the specific faulty zone. The response of the controller in terms of closing valves or issuing alerts can vary depending on the type and severity of system failure detected. The irrigation controller can also detect faulty control valves if water flow is measured when the control valve is not activated (closed) which is the default mode of valve operation (i.e., control valve is normally closed). If water flow is detected when a valve is not active then the user can be alerted to the faulty valve.

Water flow feedback from each zone can not only be used to determine if a system is operating properly or malfunctioning. The typical flow can also be used to estimate how much water volume will be used for each zone when the user programs a specific valve runtime for future scheduled watering. Furthermore, the water flow measurement feedback data can be stored so that historical watering trends and cost of system operation can be monitored and adjusted by the user based on real-time measured water flow and water volume data.

A more complete understanding of embodiments of the present disclosure will be obtained from the following detailed description when taken in connection with the attached drawings.

BRIEF DESCRIPTION OF THE DRAWINGS

FIG. 5 Table showing the corresponding relation between flow meters and controls valves which would be established by the method in FIG. 4 for the irrigation system shown in FIG. 1. An 'X' in a table cell indicates a relationship has been established (i.e., flow>0) between a flow meter on x-axis and a control valve (i.e., zone) on the y-axis while an 'O' indicates no relation exists between flow meter on x-axis and valve on y-axis.

FIG. 6 Table showing the corresponding relation between flow meters and control valves which would be established by the method in FIG. 4 for the irrigation system shown in FIGS. 2 and 3. An 'X' in a table cell indicates a relationship has been established between a flow meter on x-axis and a control valve (i.e., zone) on the y-axis while an 'O' indicates no relation exists between flow meter on x-axis and valve on y-axis.

DETAILED DESCRIPTION

Irrigation systems are comprised of at least one irrigation controller with at least one zone and only one control valve per zone. A zone defines the use area to be watered and the flow of water to that zone is controlled by the zone's corresponding control valve. Consequently, the terms 'zone' and 'valve' are synonymous since there is normally a one-to-one relation between zones and control valves. In addition, the irrigation system includes one or more flow meters. There can be no more than one flow meter associated with each valve but there can be more than one control valve associated with each flow meter. Control valves and flow meters are connected to the irrigation controller either by wires or wirelessly so that the control valves can be opened or closed and data from the flow meters can be received by the irrigation controller.

Figure 1:
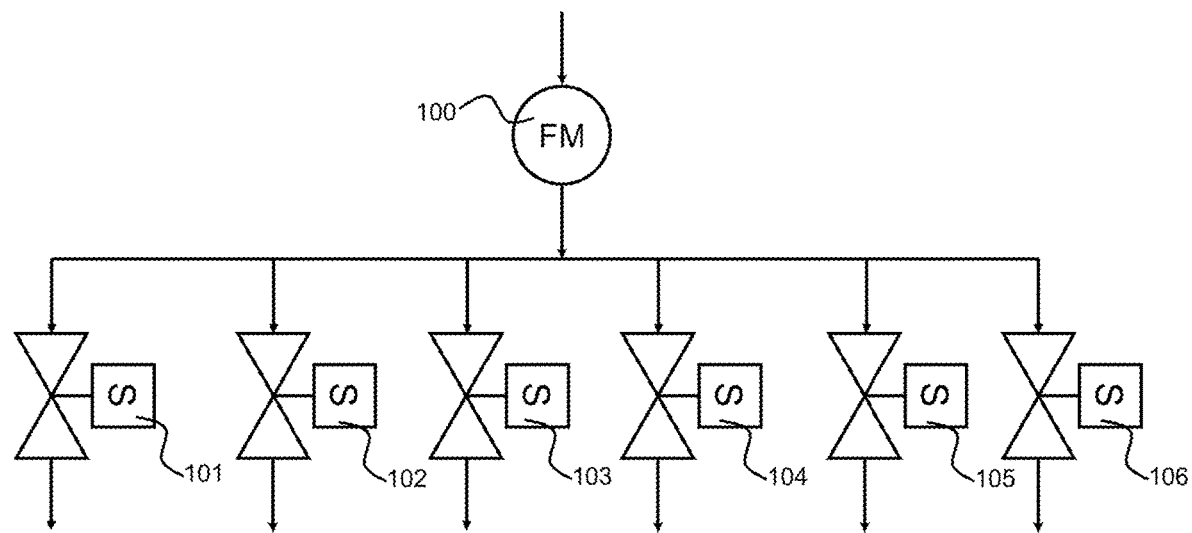
FIG. 1 Diagram showing one flow meter installed at input to water manifold with six control valves.

FIG. 1 shows the simplest embodiment of an irrigation system with one flow meter 100 installed at the main input to a water manifold with six control valves 101, 102, 103, 104, 105, 106 which correspond to six zones. Similarly, the system can be expanded to any number of control valves with one flow meter at the main input to the water manifold. Only one control valve can be activated at any one time by system design due to water pressure limitations of the irrigation system. In another embodiment, one or more water manifolds, such as the layout shown in FIG. 1, can be connected in parallel such that there is a flow meter at the input to each manifold. When any control valve is activated by the irrigation controller, the flow meters will provide feedback to the irrigation controller. By activating each valve either in turn or during normal watering operations, the irrigation controller will automatically learn which control valve is associated with which flow meter based on whether water flow is detected (i.e., flow>0). This is the preferred method for determining the relation between each control valve and its corresponding flow meter. Alternatively, the user could manually input the relation between each control valve and its corresponding flow meter.

Figure 2:
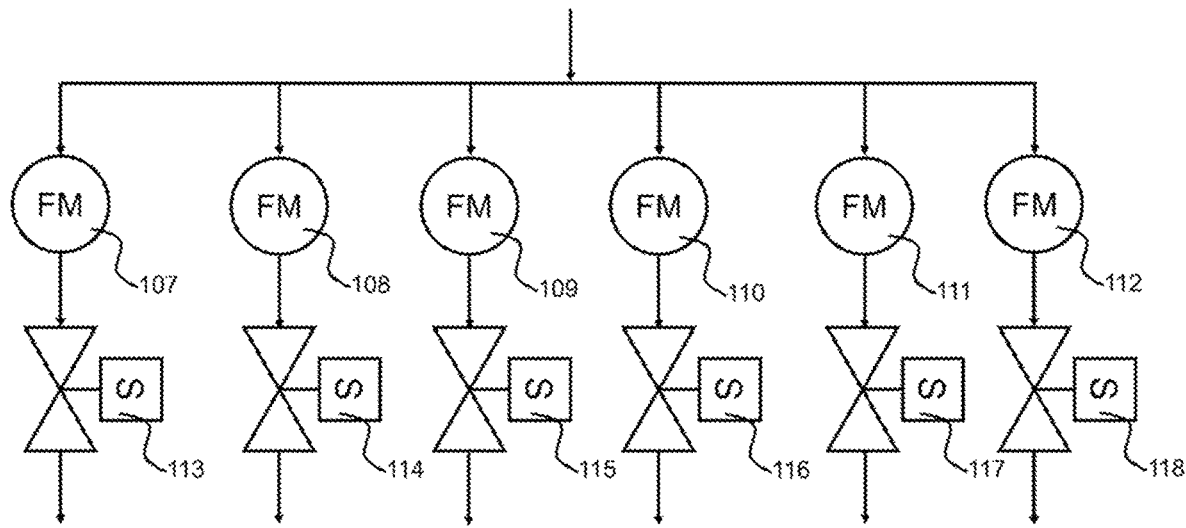
FIG. 2 Diagram showing six flow meters and six control valves installed in a water manifold; one flow meter installed at the input of each control valve.
Figure 3:
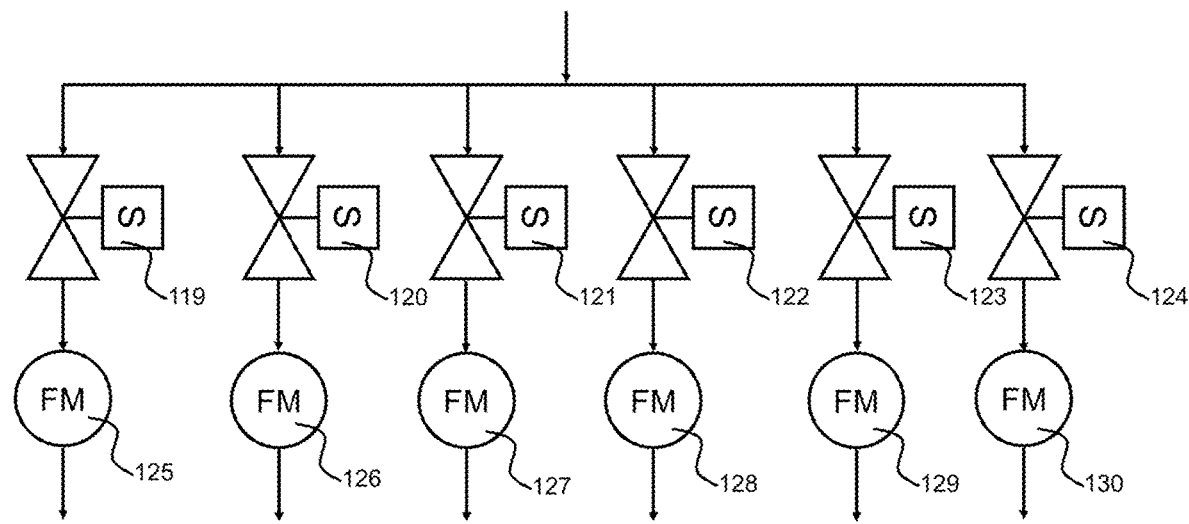
FIG. 3 Diagram showing six flow meters and six control valves installed in a water manifold; one flow meter installed at the output of each control valve.

FIG. 2 shows a preferred embodiment of the system in which one flow meter 107, 108, 109, 110, 111, 123 is located at the input of each control valve 113, 114, 115, 116, 117, 118. The system operates the same as the system described in FIG. 1 but the system in FIG. 2 has the advantage that any leaky control valve can be specifically identified. An equivalent approach to FIG. 2 has a one flow meter 125, 126, 127, 128, 129, 130 at the output of each control valve 131, 132, 133, 134, 135, 136 as shown in FIG. 3. In the case of FIG. 1 or similar system with more than one control valve per flow meter, the irrigation controller cannot specifically identify which of multiple valves connected to one flow meter is malfunctioning. Like the system in FIG. 1, the systems in FIGS. 2 and 3 can be expanded to any number of flow meters connected one-to-one to the same number of control valves. By activating each valve in turn, the irrigation controller will learn which control valve is associated with which flow meter. This is the preferred embodiment but other embodiments are possible by combining parts or aspects of the irrigation system layouts shown in FIGS. 1, 2 and 3.

Figure 4:
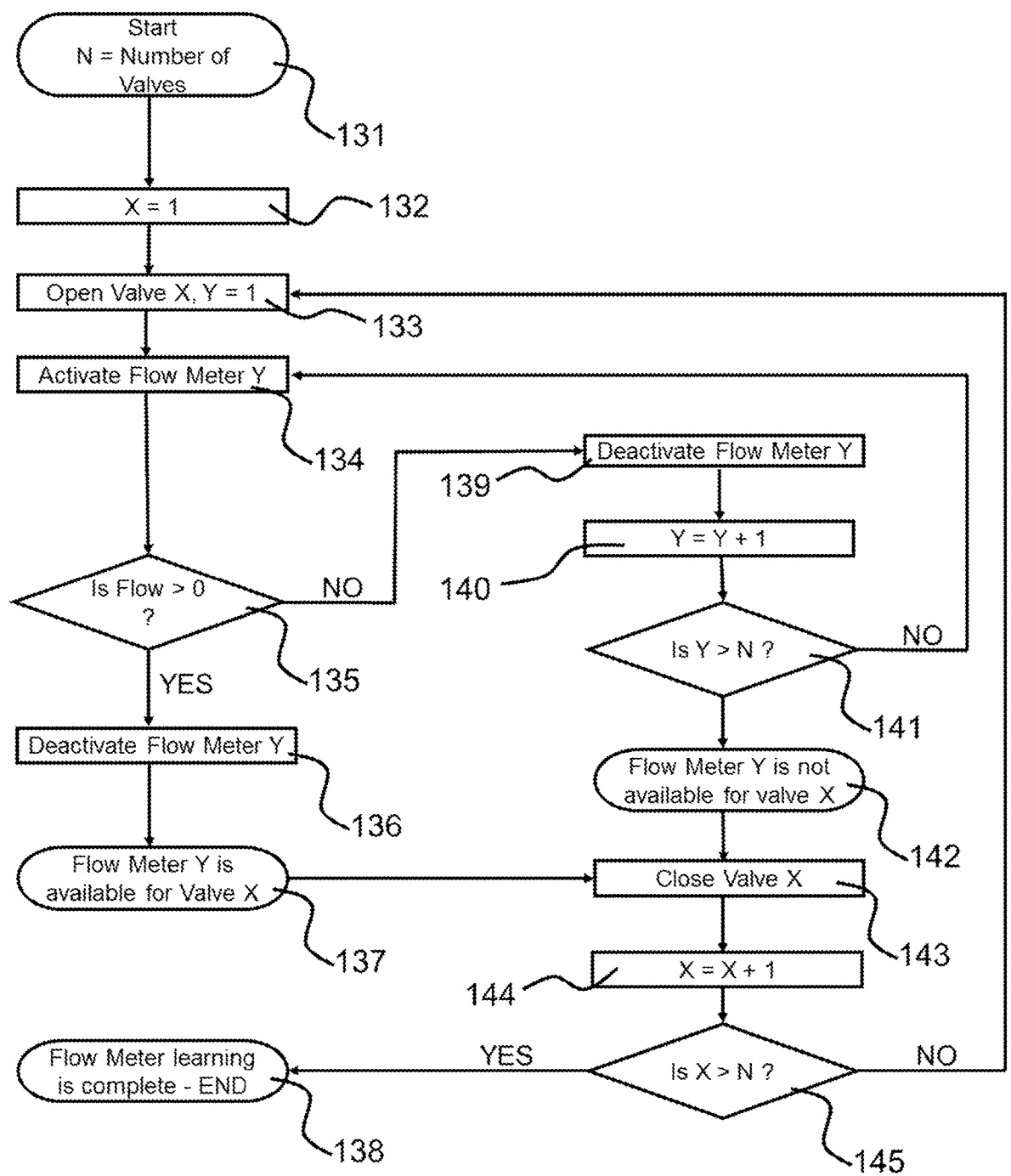
FIG. 4 Flowchart for method used by controller to automatically determine relation of each flow meter to each control valve in an irrigation system.

A preferred method used by the controller for determining the relation between control valves and flow meters is shown in FIG. 4. For a system with N control valves 131, also referred to as stations, the system will have N zones with a maximum number of allowable flow meters also equal to N. Fewer than N flow meters are allowed depending on the specific system layout, as shown in FIGS. 1, 2 and 3, but only one flow meter can be associated with each zone (i.e., control valve). Furthermore only one control valve can be activated at a time. The controller activates each zone, X, in sequence 132, 133; however, before cycling to the next zone, the controller cycles through each possible flow meter, Y, 134 and checks if water flow is detected (i.e., water flow>0) 135. If water flow is detected for zone X and flow meter Y then a relation is confirmed between zone X and flow meter Y 136, 137 and the controller increments to the next zone, X+1, 143, 144. If water flow is not detected at zone X and flow meter Y then the flow meter count is incremented, Y+1, 139, 140 until either water flow is detected 134, 135 or Y is greater than N 141. If a relation between zone X and flow meter Y has been established or flow meter count Y is greater than N, the controller increments to the next zone, X+1, 144. Once the controller zone count, X, is greater than N 145, the method is completed and all possible relations between zones (i.e., control valves) and flow meters have been established.

FIGS. 5 and 6 show two examples of the zone to flow meter relations which the method described in FIG. 4 would establish for the irrigation system configurations shown in FIGS. 1 and 2, respectively. An "X" within a table cell indicates that flow has been detected and an "O" indicates that flow has not been detected. In FIG. 5, one flow meter has been assigned to zones 1 to 6 which corresponds to FIG. 1 in which there is one flow meter at the input to six control valves. In FIG. 6, flow meters have been assigned separately to each zone which corresponds to FIG. 2 or 3 in which there is one flow meter at the input or output, respectively, of each of the six control valves.

Figure 7:
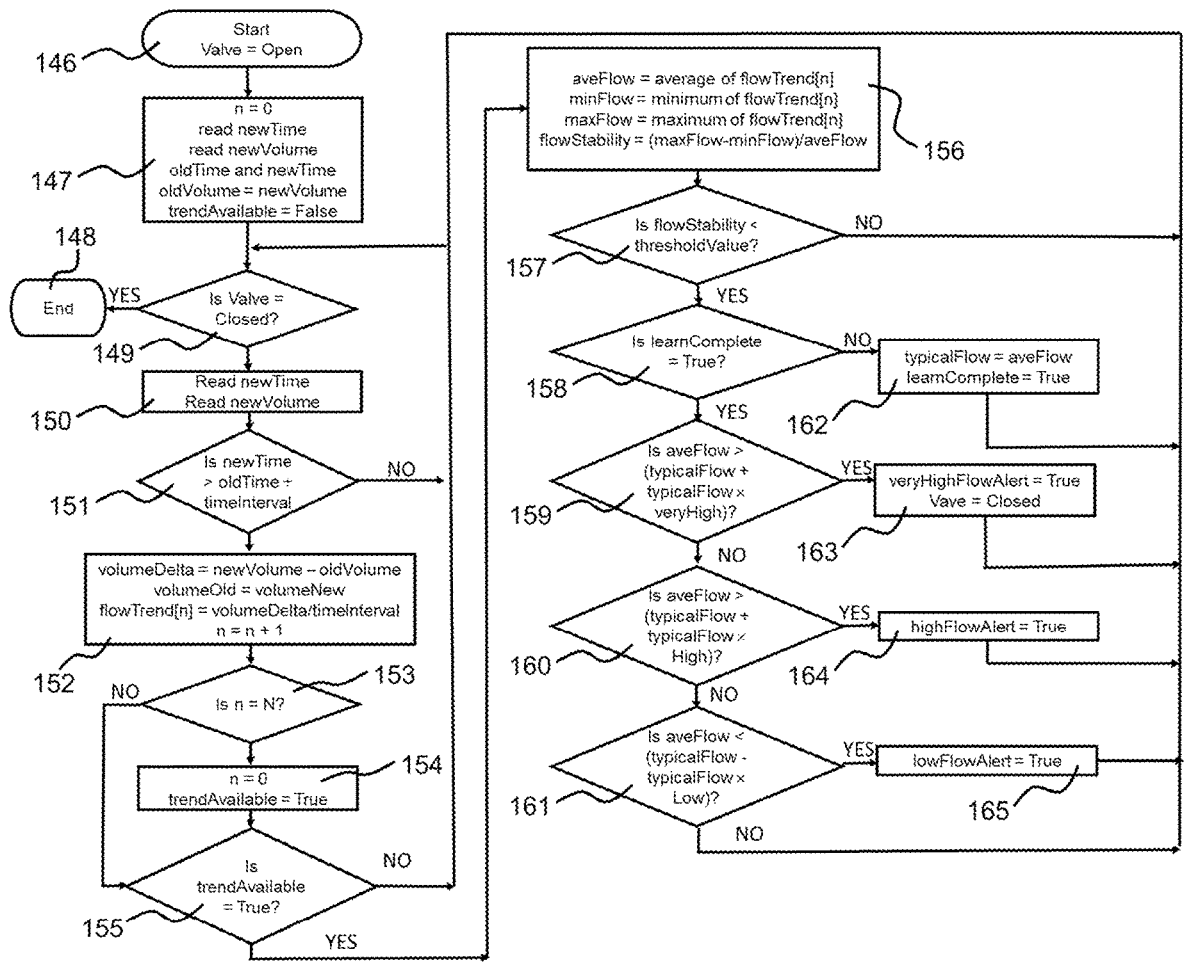
FIG. 7 Flowchart showing a method for measuring water flow, determining stable water flow measurements, assigning typical flow as a reference water flow value, triggering electronic alerts and/or actions by the controller based on a comparison of typical flow and average water flow during scheduled watering operations.

FIG. 7 shows a preferred method for measuring and calculating stable water flow, determining typical flow and triggering alerts when the irrigation system detects low or high water flow. Measurement of water flow during scheduled watering operations or whenever a valve is active is subject to fluctuations caused by many factors such as main water pressure, air trapped in the irrigation lines, partial drainage of the water lines after previous watering cycles, etc. In order to minimize the impact of these varying environmental conditions on water flow measurements, the controller uses multiple measurements to establish a precise, reliable and stable water flow value for each zone. The method described in FIG. 7 does this by continuously measuring water flow at preset time intervals and then calculates a moving average of N consecutive measurements. When the range divided by the average of the N consecutive water flow measurements is less than a certain preset threshold value then the method establishes that the water flow is relatively stable and the average water flow for the set time period is recorded by the controller as a valid (i.e., stable) water flow measurement.

When a valve is activated for the first time and the method in FIG. 7 establishes a stable water flow measurement, then this average water flow value is saved in memory by the controller as the typical flow for the active valve (i.e., zone). Ideally, this stable typical flow should be acquired when the irrigation system is working properly with no leaks or high water flow present since this becomes the reference flow for the active zone. If changes or repairs are made to the irrigation system, the user can reset flow learning for the zones so that new typical flow values will be learned and saved to memory. If the valve is deactivated before a stable water flow measurement can be established or due to some malfunction in the irrigation system then no water flow value is saved in memory and the method will repeat the next time the valve is activated until and when a stable measurement can be achieved for the active valve. Once a typical flow has been learned and saved in memory for a specific valve, then the same method descried in FIG. 7 is used to continuously calculate an average water flow value and check water flow stability while the valve is still active or anytime the valve is activated in the future. These new stable average water flow values for a specific zone are then compared to the typical flow for the same zone to determine if the irrigation system and more specifically whether the activated zone is operating properly or if low water flow, leaks or high water flow are occurring for any specific zone.

Referring more specifically to the method shown in FIG. 7, when a valve is activated 146, values for 'oldTime', 'newTime', 'oldVolume', 'newVolume' and 'trendAvailable' are read by the controller and initialized 147. If the valve is deactivated (i.e., closed) then the method ends 148; otherwise, new values for 'newTime' and 'newVolume' are read 150. If time greater than a preset duration, 'timeInterval', has passed between readings 151 then water flow is calculated 152 and stored in an array, 'flowTrend', of N elements where N has been preset as the total number of flow measurements in the array to check flow stability. The 'flowTrend' array index n is then incremented 152. If time between measurement readings is not greater than the preset 'timeInterval' 151, the sequence repeats and checks if the valve is still active 149. New values for volume and time are read 150 and the duration between readings is checked again 151 until the time interval between readings is greater than the preset 'timeInterval'.

After a total of N measurements are completed 153 then the index, n, of the 'flowTrend' array is set to 0 and 'trendAvailable' is set to true 154. If N measurements have not been completed then 'trendAvailable' is false 155 and the method will repeat the sequence starting with a check as to whether the valve is still active 149. In the case that 'trendAvailable' is true 155 then the average water flow, 'aveFlow', is calculated and minimum water flow, 'minFlow', maximum water flow, 'maxFlow' are determined for 'flowTrend" array 156. These value are then used to check water flow measurement stability, 'flowStability', 156 which is the difference between maximum water flow and minimum water flow divided by the average water flow 156. If 'flowStability' is not less than a preset threshold, 'thresholdValue', 157 then the method repeats 149 and takes an additional water flow measurement after first checking whether the valve is still active. The method will continue taking new measurements and calculating a moving average of N measurements until 'flowStability' is less than the 'thresholdValue' 157 or the valve is deactivated 149, 148.

If 'flowStability' is less than a preset 'thresholdValue' 157 then the next step is to check if learning has been completed, 'learnComplete', for the active zone 158. If 'learnComplete' is false 158 then typical flow, 'typicalFlow', for the active zone is set equal to aveFlow', 'learnComplete' is set to true 162 and the method continues the moving average by adding a new measurement and repeating the method starting from a check as to whether the valve is still active 149. The 'typicalFlow' is only calculated one time for each valve and is used as the reference flow to determine if very high, high or low flow are occurring. Once 'learnComplete' is set to true, 'typicalFlow' will only be re-calculated for each zone if the user resets flow learning which sets 'learnComplete' to false. This method of the user setting 'learnComplete' to false is not shown in FIG. 7.

If 'learnComplete' is true 158, then 'typicalFlow' for the zone (valve) has been determined. In this case, anytime the valve is active, the method will calculate average flow for N measurements, check stability, and compare the current average water flow to typical flow for the specific zone if the average water flow is stable. Alerts are then triggered 163, 164, 165, if out-of-range flow is detected. The check for very high, high or low flow is done by comparing the current 'aveFlow' against 'typicaFlow' plus 'typicalFlow' multiplied by 'very high', 'high' or 'low' limits which are set by the user 159, 160, 161 as percent values. If any conditions 159, 160, 161 are true then 'veryHghFlowAlert', 'highFlowAlert', or 'lowFlawAlert' are set to true 163, 164, 165 depending on the specific condition which is met and an electronic alert, such as e-mail or SMS message, is sent to the user. In the case of 'veryHighFlow' set to true 159, the valve is automatically deactivated 163 since this represents a major leak. After all alerts have been set to true or false, the method continues taking additional measurements after first checking if the valve is still active 149. In this way, the method continues the moving average and continuously checks if alerts need to be set as long as the valve continues to be active.

A preferred embodiment of the method described in FIG. 6 is to define N 152 as greater than or equal to 3, 'thresholdValue' 157 as greater than or equal to 10%, the 'low limit' 161 between −15% to −45%, the 'high limit' 160 between +15% and +45% and the 'very high limit' 159 to be greater than +45%. However, these limits can be adjusted to improve reliable detection of leaks or low flows depending on the normal operating condition for any specific irrigation system. In addition, whenever an irrigation system is physically modified, new reference typical flow values for each zone must be learned.

In addition to triggering electronic alerts, the typical flow and average water flow values for each zone can be used to project future water volume usage and track historical water volume and cost trends which allow the user to monitor and adjust watering schedules to conserve water as well as reduce cost. Future water usage is calculated using typical flow values and programmed valve runtimes for each zone. Historical water use trends are calculated for each zone using stable average water flow values and programmed valve runtimes whenever a valve is active.

What is claimed is:

1. An apparatus for use in a water irrigation system, comprising:
   an irrigation controller configured to control N control valves and Y flow meters when the Y flow meters are coupled to the N control valves, wherein N is an integer greater than 2 and Y is an integer less than or equal to N, and
   wherein the controller is configured to activate each of the N control valves one at a time and to determine, for each of the activated N control valves, a particular Y flow meter that detects a non-zero fluid flow to thereby identify the Y flow meters coupled to the N control valves, and
   wherein the controller is configured to determine a stable water flow based on a first plurality of fluid flow measurements from the one of the Y flow meters coupled to the activated control valve.

2. The apparatus of claim 1, wherein Y=N with each of the N control valves coupled to a corresponding one of the Y flow meters.

3. The apparatus of claim 2, wherein each of the N control valves includes an input and an output, and wherein for each of the N control valves a corresponding one of the Y flow meters is coupled to one of the input and the output.

4. The apparatus of claim 1, wherein Y=1 and a single flow meter coupled to the N control valves.

5. The apparatus of claim 1, wherein each of the N control valves is configured to provide fluid to a corresponding usage area or zone.

6. The apparatus of claim 1, wherein the controller is further configured, for each of the N control valves, to:
   activate the control valve;
   sense the first plurality of fluid flow measurements from the one of the Y flow meters coupled to the activated control valve; and
   determine a reference typical fluid flow through the activated control valve based on the first plurality of fluid flow measurements.

7. The apparatus of claim 6, wherein the controller is further configured, in determining the reference typical fluid flow, to calculate an average based on the first plurality of fluid flow measurements.

8. The apparatus of claim 1, wherein the first plurality of fluid flow measurements include a minimum value and a maximum value, and wherein controller is further configured to calculate a flow stability parameter corresponding to the stable water flow based on the minimum value, maximum value, and the average based on the first plurality of fluid flow measurements.

9. The apparatus of claim 7, wherein the controller is further configured, after the controller has determined the reference typical fluid flow for each of the N control valves, to:
   activate one of the N control valves;
   sense a second plurality of fluid flow measurements from the one of the Y flow meters coupled to the activated control valve;
   determine an average fluid flow through the activated control valve based on the second plurality of fluid flow measurements;
   compare the average fluid flow and the reference typical fluid flow for the activated control valve; and
   generate alerts based on the comparison of the average fluid flow and the reference typical fluid flow.

10. The apparatus of claim 9, wherein the alerts include one more or more of text message or email alerts.

11. A system, comprising:
    N control valves;
    Y flow meters coupled to the N control valves, wherein each of the N control valves is coupled to only one of the Y flow meters and Y is less than or equal to N; and
    a controller coupled to the N control valves and Y flow meters, the controller configured to:
      activate each of the N control valves one at a time and to determine, for each of the activated N control valves, the one of the Y flow meters that detects a non-zero fluid flow to thereby identify the one of the Y flow meters that is coupled to each of the N control valves;
      after the one of the Y flow meters coupled to each of the N control valves has been identified, for each of the N control valves, activate the control valve and sense a first plurality of fluid flow measurements from the one of the Y flow meters coupled to the activated control valve, and determine a reference typical fluid flow through the activated control valve based on the first plurality of fluid flow measurements; and after the reference typical fluid flow for each of the N control valves has been determined, activate one at a time each of the N control valves and sense a second plurality of fluid flow measurements from the one of the Y flow meters coupled to the activated control valve, and determine an average fluid flow through the activated control valve based on the second plurality of fluid flow measurements, compare the average fluid flow and the reference typical fluid flow for the activated control valve, and generate alerts based on the comparison of the average fluid flow and the reference typical fluid flow, wherein the first plurality of fluid flow measurements include a minimum value and a maximum value, and wherein controller is further configured, in determining the reference fluid flow, to calculate a flow stability parameter based on the minimum value, maximum value, and an average based on the first plurality of fluid flow measurements and to set a value of the reference typical fluid flow only if the flow stability parameter is less than a threshold value.

12. The system of claim 11, wherein Y=N with each of the N control valves coupled to a corresponding one of the Y flow meters.

13. The system of claim 12, wherein each of the N control valves includes an input and an output, and wherein for each of the N control valves the corresponding one of the Y flow meters is coupled to one of the input and the output.

14. The system of claim 11, wherein Y=1 and the system includes a single flow meter coupled to the N control valves.

15. The apparatus of claim 8 wherein the flow stability parameter is a difference between the maximum value and the minimum value divided by the average.

16. The apparatus of claim 8 wherein the flow stability parameter is compared to a threshold, and wherein a reference typical fluid flow through the activated control valve is set when the flow stability parameter is below a threshold.

* * * * *